United States Patent [19]

Briggs et al.

[11] 4,201,544
[45] May 6, 1980

[54] HIGH PRESSURE HEATER

[75] Inventors: Eugene C. Briggs; William E. Gustafson, both of Bowling Green, Ky.

[73] Assignee: Keohring Company, Milwaukee, Wis.

[21] Appl. No.: 850,088

[22] Filed: Nov. 10, 1977

[51] Int. Cl.² .................... F24H 3/04; B01D 33/34
[52] U.S. Cl. ................................ 432/222; 432/223; 432/224; 431/117; 417/350
[58] Field of Search ................ 432/222, 223, 224; 126/110 B; 431/117; 210/416 F; 417/350

[56] References Cited

U.S. PATENT DOCUMENTS

| | | | |
|---|---|---|---|
| 2,164,954 | 7/1939 | Stephens | 432/223 |
| 3,008,309 | 11/1961 | Alt | 417/350 |
| 3,240,478 | 3/1966 | Marks | 432/223 |
| 3,256,003 | 6/1966 | Briggs | 432/222 |
| 3,263,978 | 8/1966 | Safford | 432/223 |
| 3,272,129 | 9/1966 | Leopold | 417/350 |
| 3,301,308 | 1/1967 | Briggs | 432/222 |
| 3,319,947 | 5/1967 | Truesdell | 432/223 |
| 3,401,920 | 9/1968 | Berkhoudt et al. | 432/223 |
| 3,706,446 | 12/1972 | Briggs | 432/224 |
| 3,794,461 | 2/1974 | Brazee | 432/222 |
| 3,900,397 | 8/1975 | Bell | 210/416 F |
| 4,081,238 | 3/1978 | Briggs et al. | 432/222 |
| 4,089,642 | 5/1978 | Briggs et al. | 432/222 |

*Primary Examiner*—Henry C. Yuen
*Attorney, Agent, or Firm*—Jerome P. Bloom

[57] ABSTRACT

A portable space heater features a tubular heat shield of generally uniform cross sectional configuration about and in longitudinally offset, concentric, closely spaced relation to a tubular shell defining its combustion chamber to project beyond a nose cone at its outlet end. The projection of the shield beyond the cone is limited to produce, upon a high velocity pressurized flow of air around the inner surface of and the length of the shield, distinctive flow of air within the projected end of the shield and about the nose cone the pattern of which produces an effective heat exchange with the products of combustion at the cone which substantially moderates the cone temperature.

The heater fuel tank embodies a screen device accommodating the connection of a suction line and the discharge end of a fuel return line, which lines connect to a fuel pump which draws fuel from the tank through the suction line in excess of that required and returns the excess to produce a turbulence which scrubs the screen interior and inhibits passage to the pump of objectionable solids.

The fuel pump and the motor powering the heater have a slip fit coupling between their drive shafts, which requires no fasteners.

14 Claims, 10 Drawing Figures

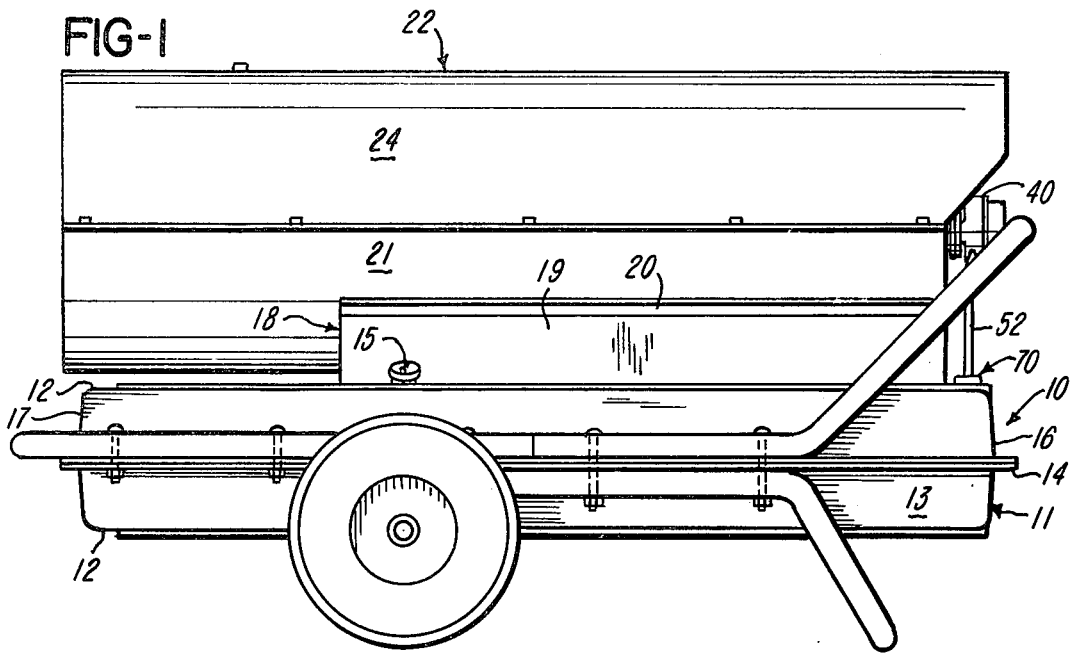
FIG-1
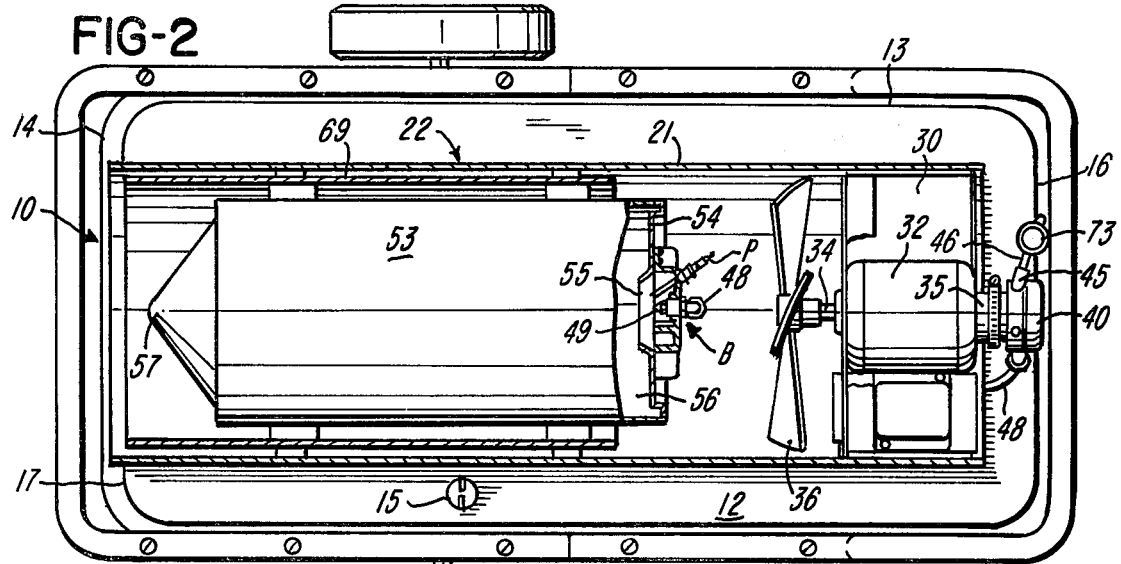
FIG-2
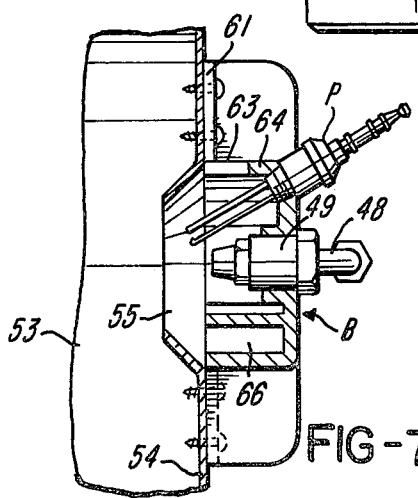
FIG-7
FIG-8

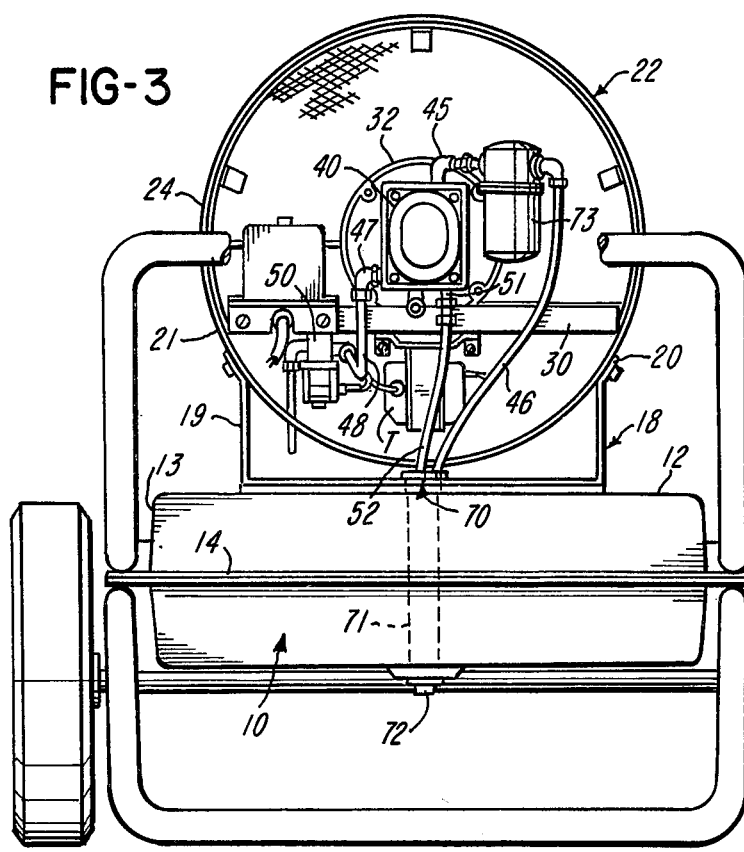
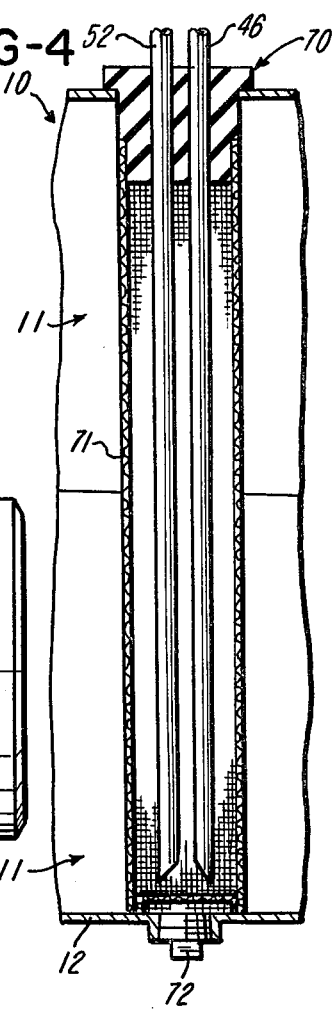
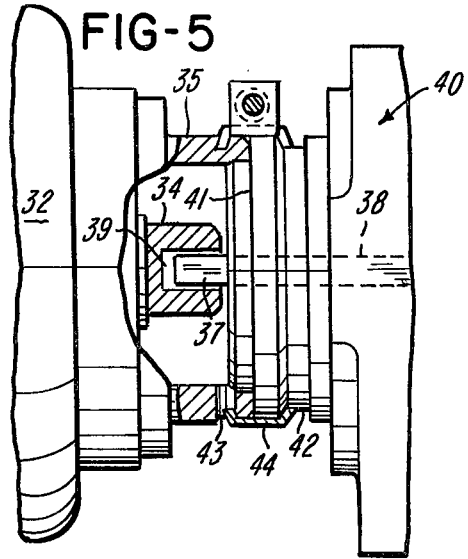
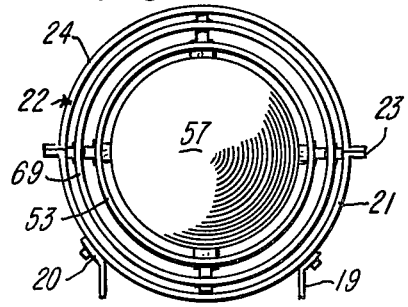

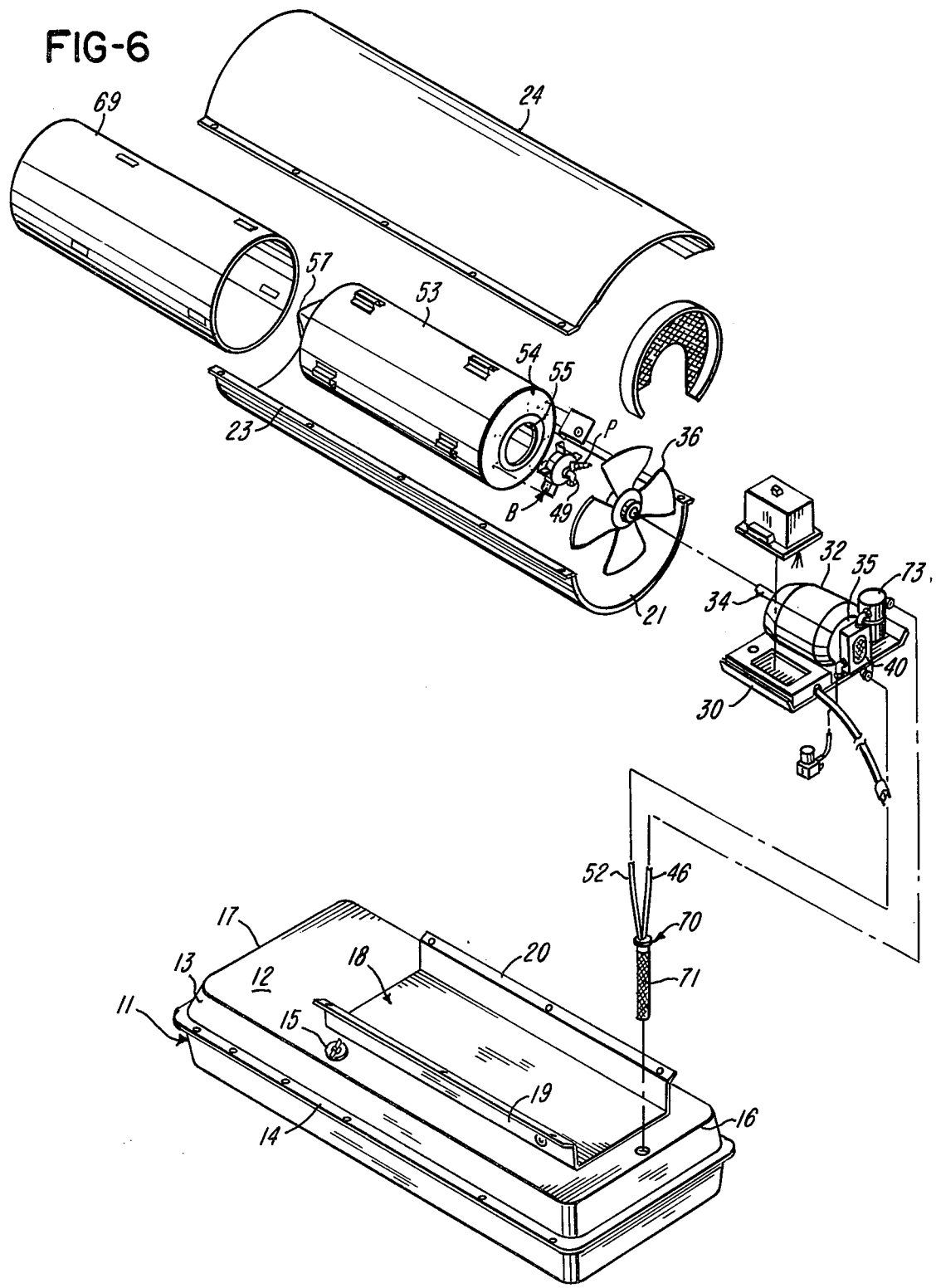

HIGH PRESSURE HEATER

BACKGROUND OF THE INVENTION

This invention relates to a new and improved high pressure portable space heater which is relatively economical to fabricate, more satisfactory in use and highly unlikely to malfunction. Invention embodiments feature a construction to insure against extreme heat in the nose cone area and to provide, in fact, a more balanced heat distribution and safer operation. To protect against malfunction they embody fuel controls including a new and improved dynamic filter system and a simplified drive connection from the motor to their fuel pump. The latter enables a substantial reduction in motor cost.

The advanced state of the art is exemplified by the following U.S. Pat. Nos. 3,706,446; 3,101,193 and 3,129,748. In spite of the past improvements of portable space heaters illustrated in these and other patents, many problems have still remained in the operation of such heaters. For example, they have continued to be plagued with hot spots and to be uni-directional in their distribution of heat. Their filtering systems, moreover, have been less than satisfactory and due to the construction of their fuel pumping devices they have usually required special types of drive motors. These and other problems are solved by the present invention.

SUMMARY OF THE INVENTION

The invention provides a portable space heater with a simple combustion chamber simply housed and controlled by a specially arranged heat shield. The arrangement is such to induce an inherent movement of a portion of the moderately heated air passing the combustion chamber into the area about its nose cone in a manner to moderate its temperature to a safer level and provide a more general and safer distribution of the extracted heat.

Embodiments of the invention may be effectively and efficiently operated with a 5000 volt ignition system, producing a major cost savings. Contributing to this and to a low cost heater is the design of the connection between the fuel pump and its drive motor, a tang-like connection being provided on the fuel pump drive shaft to nest in a socket in the motor drive shaft. This feature enables the use of an inexpensive readily available low cost motor which is extremely efficient for the heater design here provided.

Most important are the improvements provided in the fuel supply system which incorporates a unique filtering arrangement. Fuel is drawn to the fuel pump in quantities in excess of that required to supply the heater fuel nozzle for combustion purposes and the excess is returned to the fuel tank employed to exit within a filter screen in an area occupied by inlet of the fuel suction line of the pump. Thus, when the pump is operated, fuel is simultaneously drawn to the interior of the screen and into and through the suction line for delivery to the nozzle at the same time excess fuel is being returned to the interior of the filter screen under pressure. The pressured return of fuel produces a continuing turbulence of the fuel within the filter which scrubs the interior of its screen construction and pushes away the dirt and other particles in the stored fuel to inhibit their entry to the suction line. This insures "clean" fuel being passed through the fuel system, avoiding clogging, break down and dangerous malfunction. This last is of particular importance for portable space heaters which are usually unattended during their operation. A motor control is also provided to prevent fuel from reaching the heater fuel nozzle before the heater drive motor reaches its prescribed running speed.

It is accordingly a primary object of the invention to provide a new and improved portable space heater which is economical to fabricate yet more efficient and satisfactory in use, adaptable to a wide variety of applications and unlikely to malfunction.

Another object of the invention is to provide a substantially improved portable space heater the construction and arrangement of which is such to require no more than a 5000 volt ignition system for its effective use.

An additional object of the invention is to provide a high pressure heater featuring an improved heat shield for the combustion chamber which eliminates the danger of extreme hot spots, particularly in its nose cone area.

A further object of the invention is to provide a simplified drive system between the motor and pump assembly of a portable space heater, enabling the use in such heaters of a low cost drive motor.

Another object of the invention is to provide a new fuel supply system having an improved dynamic filtering arrangement which is particularly advantageous for application to high pressure space heaters.

An additional object of the invention is to provide an improved portable space heater and componentry thereof having the features of construction, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a side elevation view of a portable space heater embodying the features of the present invention;

FIG. 2 is a top plan view of the heater with parts broken away for clarity of disclosure;

FIG. 3 is a rear end view of the heater diagrammatically illustrating its dynamic filtering system;

FIG. 4 is a fragmentary enlarged view further detailing the filter system;

FIG. 5 is a fragmentary view showing the structural interconnection of the heater motor and the interrelated fuel pump;

FIG. 6 is an exploded view of the major components of the heater;

FIG. 7 is a fragmentary sectional view showing the relationship of the burner head and heater nozzle to the rear head of the combustion chamber in the example illustrated;

FIG. 8 is a view of that face of the burner head which opens to the interior of the combustion chamber;

FIG. 9 is a front end view of the heater; and

DESCRIPTION OF A PREFERRED EMBODIMENT OF THE INVENTION

Figure 10:
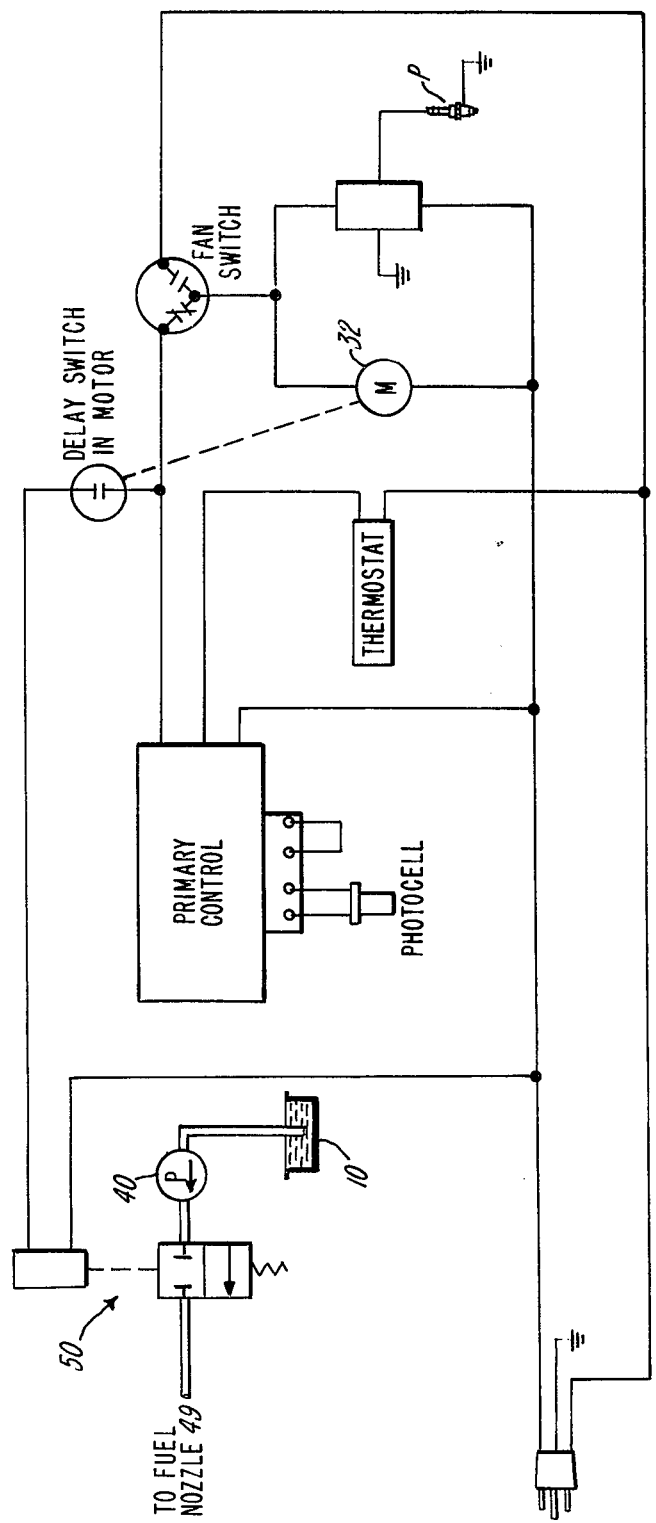
FIG. 10 is a schematic illustrating means by which the delivery of fuel is inhibited until the heater drive motor reaches its prescribed running speed.

The embodiment illustrated includes a generally flat, shallow, rectangular shell forming a fuel tank 10. The tank is comprised of two identical tray-shaped segments 11 each of which has a flat, rectangular plate-like base 12 rimmed by a peripheral upstanding wall structure 13. The projected extremity of the wall structure 13 has a coextensive outwardly projected flange 14 in a plane which is generally parallel to that of the base 12. For their assembly, one tray segment is inverted over the other and their flanges 14 are superposed, coextensively abutted and welded together. Thus, the flat base 12 of one tray forms the top of the tank while the base of the other tray forms its bottom. A cap 15 plugs a filler hole in the top of the tank which is located to one side thereof and intermediate its length.

Fixed on the top surface of the tank 10, centered between its longitudinal sides and more closely adjacent what might be considered its rear end 16 than its forward end 17, is a channel member 18 which has a generally rectangular configuration. As viewed from either end thereof, the channel member has, in a transverse sense, a rectangularly configured "U" shape the base of which seats flush with the top of the tank and the sides 19 of which project perpendicular to its upper surface. The uppermost edge portions 20 of the sides 19 are bent outwardly, the length thereof, placing them in a relatively divergent relation to seat a hemi-cylindrically shaped shell 21 which is secured thereto.

The member 18 extends somewhat more than one-half the length of the tank 10, from a point adjacent but spaced from its rear end 16. Shell 21, by contrast, has its rearmost end in line with the rearmost end of the member 18, extends the length thereof and projects forwardly therefrom in closed spaced parallel relation to the upper surface of the tank 10 and to its forward end 17.

The shell 21 provides the lower half of a heater housing 22. Its uppermost diametrally spaced edges, which define its circumferential extremities, lie in a horizontal plane and include, in the same plane, coextensive external shell flanges 23. A second generally hemi-cylindrical shell structure 24, similar to the shell 21, formed on the same radius and similarly flanged, in relatively inverted and superposed on the shell 21 so its diametrally spaced external flanges seat on and coextensively with the flanges 23, to which they are releasably secured by conventional bolts and nuts. As so connected the shells 21 and 24 define the tubular heater housing 22. Housing 22 is distinguished by the fact its upper half has an extension at its rearmost end which provides a cap-like portion which overlies the rearmost end of the tank 10.

Fixed in a recessed, nested and bridging relation to the inner wall surface of the shell 21 providing the lower half of the housing 22, in spaced, adjacent relation to its rearmost end, is a tray-like plate 30. A drive motor 32 is fixed in centered relation to the upper surface of the plate 30 to provide that its drive shaft 34 extends in a sense longitudinally of the tank 10, centered between its sides. The forwardly projected end of the shaft 34 is flatted and mounts in keyed relation thereto a rotor 36 resembling in configuration the blade assembly of a fan. The rearwardly projected extremity of the shaft 34 which positions within and in concentric spaced relation to a tubular adapter 35 at the rear end of the motor housing has a diametral slot 39 accommodating the flat, rectangularly configured, tang-like end 37 of a shaft 38. The shaft 38 is the drive shaft of an otherwise conventional gear-type fuel pump such as widely used in the space heater industry. Since its internal composition is so well known and since the modifications as provided by the invention are external, the internal construction of the pump is neither illustrated nor particularly described. The important aspect of the tang modified end of the shaft 38 is that it may be simply accommodated, with a slip fit, in the adjacent end of the motor drive shaft. As this coupling is achieved, a cylindrical adapter plate construction 41 on the end of the fuel pump 40 positioning adjacent the motor caps the outer end of the adapter 35. A groove 42 circumferentially of the adapter 41 is thus positioned in adjacent spaced relation to a groove 43 circumferentially of the adapter 35. The grooves 42 and 43 serve to anchor portions of a strap-like clamp 44 used to couple the motor housing and the fuel pump so their shafts are in a coaxial relation.

Mounted below the motor 32 and in connected dependent relation to the plate 30 is a transformer T, embodied in appropriate circuitry as required to power and for the operation of the heater unit. Neither such circuitry nor the conventional thermostat and fail safe controls which are included in the unit are herein fully detailed or described since the same is not essential for an understanding of the features of the present invention.

The housing of the pump 40 is provided with appropriate fittings communicating with its pumping chamber including, on its suction side, an inlet fitting 45. One end of a suction line 46 coupled to the fitting 45 has the opposite inlet end thereof inserted in the tank 10. On its pressure side the pump has an outlet fitting 47 to which is coupled one end of a delivery line 48. The remote or discharge end of the line 48 is coupled to the inlet end of a fuel nozzle 49. A solenoid operated control valve 50 is interposed in the line 48, the function of which valve is to control the level of the fuel flow to the nozzle 49. A further fitting 51 in communication with the pumping chamber of the pump 40 serves through the medium of a coupled line 52 for the return of excess fuel drawn from the tank 10 in operation of the fuel pump.

Mounted forwardly of and in a coaxial spaced relation to the rotor 36, and concentric to the housing 22 by bracket type connectors, is a tubular shell 53 peripherally defining a combustion chamber 56, the rearmost end of which is bridged by an annular head plate 54. The inner peripheral edge of the plate 54 which bounds the entrance aperture 55 of the heater combustion chamber 56 is offset and flared to project inwardly of the combustion chamber in a somewhat conically convergent configuration.

The forwardmost end of the combustion chamber is capped by a conically configured shell forming a nose cone 57. The base of the cone 57 positions at the opening from the forward extremity of the shell 53 defined by an annular or ring shaped element in connection therewith, in respect to which opening and annular element it is slightly spaced. As thus provided the base of the cone 57 forms with the exit end of the shell 53 a restricted annular exit opening from the combustion chamber which is bridged by circumferentially spaced brackets serving to support the nose cone concentric with the shell and so as to have its rounded apex portion project outwardly beyond the forward extremity of the shell 53. The nose cone serves to provide an afterburner chamber for the heater.

Abutted to the rear surface of the plate 54 is a cup-shaped burner head B generally similar in construction to that disclosed in U.S. Pat. No. 3,298,418. In this case the peripheral wall of the burner head includes outwardly projected flange-like plate segments 61 through the medium of which the burner head is bolted to the plate 54 in capping relation to its central aperture 55. Formed integral with the plate segments 61 and projected rearwardly thereof and peripendicular thereto are narrow plate-like air deflectors the function of which is to direct air moving about the back of the burner head to enter the recess in its operating face, provided by reason of its cup-shaped configuration, by way of circumferentially spaced slots 63 in the peripheral wall 64 of the burner head. Within the recess in the operating face of the burner head, its generally cylindrical wall structure 64 has formed integral therewith and projected therefrom a series of circularly spaced arcuately configured fingers 65. The fingers 65 curve in a common direction so as to define within the recess a series of circularly spaced pockets 66 which open from the burner head operating face about the nozzle 49. The latter mounts to and centrally of and so as to project through the base of the burner head. As will be seen the slots 63 are each angled to open to one of the pockets 66 in a sense tangential to the inner surface of its bounding arcuately curved finger 65. The arrangement is such that air admitted through the slots 63 will move over the inner surfaces of the fingers 65 to swirl in the pockets defined thereby and thereby produce a series of air swirls about the discharge end of the nozzle 49. The net result is that air entering the pockets will encompass and mix with the fuel discharged under pressure from the nozzle 49 and upon ignition of the fuel-air mixture it will entrain the flame produced thereby and the products of combustion the length of the combustion chamber 56. Ignition is provided by a spark plug P threadedly engaged in the base of the head B to have its continuous sparking electrodes angled to and positioned immediately of the discharge end of the nozzle 49. The burner head structure is detailed and described, as will be seen, only to the extent necessary for the disclosure of the features of the present invention since the substance and basic concept thereof may be observed with reference to the disclosure of U.S. Pat. No. 3,298,148.

Of particular significance in the heater construction is a tubular heat shield 69 which positions within and in spaced concentric relation to the housing 22 by means of interposed interconnecting brackets. At the same time the shield 69 positions about and in spaced concentric relation to the shell 53. The shield 69 is interconnected to and spaced from shell 53 by appropriate interconnecting brackets of a conventional nature. The length and position of the shield 69 is such that its rear end is slightly forward of the rear end of the shell 53 and its forward end is projected beyond the apex end of the nose cone 57.

A distance of projection of the shield 69 beyond the nose cone found particularly advantageous in tests is dimensionally between about one-quarter and about one-half the diameter of the nose cone base, with the projected extremity of the shield lying within and immediately of the forwardmost end of the housing 22.

It will be seen from FIG. 2 of the drawings that each of the shell 53, the heat shield 69, and the housing 22 has a tubular configuration the cross section of which is generally uniform throughout its length.

With air under pressure being delivered between the shell assembly forming the housing 22 and the heat shield 69 and between the shield and the combustion chamber as defined by the shell 53 and the heater operating, the structural arrangement provides contained concentric layers of air moving about and longitudinally of the combustion chamber in essentially straight line paths within. The innermost layer moving within the shield 69 will be a high velocity, highly pressured flow of air peripherally contained by the shield beyond the nose cone 57. The pressure in the peripheral portion of the flow will be greater than that in the area immediately about the surface of the nose cone. The physical result of this pressure differential is the creation of a toroidal vortex flow pattern of the air about the nose cone. The consequence is a heat exchange between the relatively moderately temperatured air moving about the cone and the high temperature of the products of combustion at the inner surface of the cone. This causes the temperature of the nose cone to be substantially reduced as to its level from that normally found in the operation of space heaters. The reduction is such that one may use materials for the nose cone much cheaper than heretofore deemed necessary. Not only this, but the invention feature enables a heater with a more balanced temperature, eliminating what is normally a dangerous hot spot and insuring a better distribution of the heat energy which may be extracted from the fuel. A side effect is an avoidance of a normal unidirectional highly localized throwing of heat from the nose cone as usually experienced with space heaters.

With the improvements of the invention as described, a more even heating of the space in which the heater is employed is possible.

Considering now the innovation of the fuel supply system of the invention, a fuel outlet opening formed in the top of the tank 10, to the rear of the housing 22 and under its cap-like extension, is plugged by a rubber-like cylindrically shaped element 70. The outermost end of the element 70 has an external flange overlapping and sealingly abutted to the tank wall about the fuel outlet. The end of the plug element 70 innermost of the tank is reduced in peripheral dimension and telescopically mounts and frictionally retains one end of a small diameter tubular, screen-like mesh filter 71. The filter 71 extends from top to adjacent the bottom of the tank 10, generally perpendicular to its base plate portion 12. The lower end of the filter is capped. Immediately below the filter, the tank 10 has an aperture which is sealed by a drain plug 72.

The plug 70 is provided with two small side by side axially directed bores through one of which is projected the end portion of the suction line 46 remote from the fuel pump and through the other of which is projected the end portion of the line 52 remote from the pump. The end portions of the lines 46 and 52 within the tank are housed in and extend in side by side relation within the filter screen 71 to points adjacent to each other and adjacent the bottom of the tank. The lowermost ends of these lines at the bottom of the tank are obliquely cut to facilitate entry and exit of fuel. Incorporated in the line 46 adjacent the pump is a conventional filter unit 73 the use of which is for the extraction of free water and fine dirt particles from the fuel moving to the pump.

When the motor 32 is energized per the present invention, the pump rotor (not shown) will be driven to resultingly suck fuel from the tank 10 through the filter screen 71 to the entrance end of the suction line 46 at the bottom of the tank. This fuel is induced to move through the line 46 and by way of the filter 73 to the pumping chamber (not shown) of the gear type pump 40. The construction and arrangement will be such that the fuel drawn from the tank will be in amounts in excess of that required or capable of being forwarded from the pump to the nozzle 49 by way of the delivery line 48. The excess fuel which reaches the pumping chamber will be ejected therefrom and returned to the tank 10, under pressure, by way of the line 52 to exit at the bottom of the tank 10, within the screen 71 and adjacent the inlet to the suction line 46. The pressured return of the fuel produces a high turbulence of the fuel within the cylindrical screen 71 causing a scrubbing action of the fuel therein on the interior wall surface of the screen. This scrubbing action not only cleans the filter screen but throws dirt and other foreign particles outwardly therefrom and back into the outer areas of the tank. The turbulence which prevails in this fashion inhibits dirt and foreign objects reaching and entering the suction line 46. Correspondingly the fuel delivered to and from the pump is in an optimalized condition and the entire fuel system is therefore protected from entry of undesirable dirt and foreign particles which heretofore have previously led to clogging and break down of portable space heaters.

Thus, the fuel nozzle 49 is supplied with fuel under a continuing high pressure and the fuel is delivered from the nozzle in a high pressure spray at the operating face of the burner head, supported as previously described by swirling flows of air the source of which is the blades of the rotor assembly 36.

The flow of fuel will be controlled so it will not commence its flow to the nozzle until the motor is energized and it reaches its prescribed running speed. The schematic in this respect is shown in FIG. 10. As there seen, a centrifugal delay switch 80 in connection with the motor circuit is normally open and is designed to close only at such time the motor 32 comes up to its prescribed running speed. This switch 80 is in the operating circuit of the normally closed solenoid valve 50 and will operate when the motor reaches its running speed to energize the solenoid to open the valve 50 and permit fuel to flow at its prescribed rate to the nozzle 49. This safety feature avoids potential functional problems which can be highly undesirable.

At the same time the flow of fuel is initiated, air flow developed by the rotation of the rotor 36 will be directed against the rear head plate of the combustion chamber and to and through the restricted annular passages respectively provided between the heat shield 69 and the tubular wall 53 of the combustion chamber and between the same shield and the housing 22. At the time air hits the rear head plate 54 it will be in part directed by the finger plates 61 through the slots 63 in the burner head and into the pockets defined by the fingers 65 in its operating face. This produces swirls of air issuing about the delivered fuel as previously described. Upon ignition of the fuel, supported by portions of the air swirls, the remainder of the swirling air will entrain the flame resulting from ignition of the fuel and move the same and the products of combustion the length of the combustion chamber 56. Since the discharge end of the combustion chamber is in its majority capped by the nose cone 57, a substantial portion of the products of combustion, which are extremely hot and contained in a gaseous flow in which combustion continues to take place, will move into the afterburner portion of the combustion chamber defined by the relatively projected cone 57.

Air which is simultaneously moving through the annular space between the shield 69 and the tube structure 53, under the influence of the rotor 36, is heated in passage about the combustion chamber and in the process of discharge moves past the tube 53 and into an area of the shield about and forwardly of the nose cone 57. The air moving between the shield and the combustion chamber will at the point of its movement past the forward end of the tube 53 have the outer layer of its flow at a higher pressure than exists immediately about the nose cone. This causes the air in the area about the cone to move in a vortex type toroidal flow pattern. This vortex flow of air will be distinguished by a temperature which is moderate as compared to the temperature within the combustion chamber. The result is a heat transfer between the production of combustion within the one and the air about the exterior surface of the cone. The consequence is that the nose cone temperature is kept at a level substantially reduced from that level which it normally reaches in the operation of a conventional space heater producing the benefits previously described. Consequently there is an unexpected and significant control and reduction of nose cone temperature and a distribution of the heat available from the heater unit in a manner not heretofore provided.

The air moving under the influence of the rotor 36 to and through the annular space between the housing 22 and the shield 69 will also be subject to only a relatively moderate increase in heat as it passes the heat shield.

Accordingly, there will no extreme hot sports or localized heat of a dangerous level in the area of the outer surface of the heater or the area of the nose cone and the air delivered from the heat unit will be at a comfortable temperature.

By reason of the construction provided the whole heater unit will dissipate the heat developed therein in a safer and more uniform fashion and without the unidirectional emphasis normally found in use of prior art heaters of a similar nature.

Inherent in the invention construction is not only simplicity but the same provides a heater which is not prone to malfunction or to require excessive maintenance or to exhibit localized and dangerous hot spots.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A portable space heater comprising a combustion chamber the peripheral wall of which is defined by a tubular shell having a front end and a rear end, having regard for its orientation in use, the rear end of which is adapted to pass a fuel-air mixture for combustion in said chamber and the front end of which is capped by means forming an afterburner section for said chamber which projects generally axially of and outwardly from said shell and forms therewith an outlet from said chamber, a tubular heat shield having a generally uniform cross section mounted about and in a generally concentric closely spaced relation to said shell to have one end, constituting its rear end, positioned between the ends of said shell, relatively adjacent but spaced forwardly of said rear end thereof, and its opposite end, constituting its front end, positioned beyond but relatively adjacent the projected extremity of the means defining said afterburner section of said chamber, means for directing air under pressure to said combustion chamber and to move air the length of the passage which is defined between said shell and said shield and beyond said front end of said shell along an axial length of the inner surface of said shield projected beyond the means defining the afterburner section of said combustion chamber, the construction and arrangement being such to produce beyond said front end of said shell and about the outwardly projected portion of said means defining said afterburner section and said chamber outlet a toroidal flow of air in heat exchanging relation to products of combustion adjacent said means defining said afterburner section moving in a pattern to moderate the temperature of said means defining said afterburner section to a level eliminating a potentially dangerous hot spot and balancing the temperature of exposed portions of the heater.

2. A portable space heater as in claim 1 wherein said opposite end of said heat shield and the projected extremity of said means defining said afterburner section have a spacing therebetween the dimension of which is a fraction of the maximum transverse dimension of said means defining said afterburner section.

3. A portable space heater as in claim 1 wherein said means defining said afterburner section is a nose cone the apex of which projects forwardly of said front end of said shell to define its projected extremity, the opposite end of said heat shield being extended beyond the nose cone a distance to create differential air pressures at the center of said nose cone and at the axially projected length of the inner surface of said shield to produce air flows having a cooling effect upon said nose cone.

4. A portable space heater as in claim 1 wherein said opposite end of said shield is located beyond said projected extremity of said means defining said afterburner section a distance which dimensionally is in a range not exceeding about one half the maximum transverse dimension of said means defining said afterburner section of said combustion chamber.

5. A heater as in claim 1 wherein said means defining said afterburner section is a nose cone the apex of which defines its projected extremity and the projection of said tubular shield beyond the apex of said nose cone is dimensionally within a range not exceeding about one half the diameter of the base of said nose cone, and said nose cone is open at its base to define therein said afterburner section adjacent said outlet.

6. A portable space heater as in claim 1 and means for delivery of fuel to said combustion chamber including a fuel pump having a drive shaft, said means for directing air under pressure including a motor having a drive shaft one end of which mounts an air moving means and the opposite end of which has a male-female slip fit coupling with the drive shaft of said fuel pump to provide for the simultaneous drive of said motor drive shaft and said pump drive shaft, said coupling being provided by one of said motor drive shaft and said pump drive shaft being intersected by a recess and accommodating a complementary non-circular projection from the other the form of which is such to preclude relative rotation between said shafts by virtue of the slip fit thereof, one to the other.

7. A portable space heater comprising a combustion chamber the peripheral wall of which is defined by a tubular shell, one end of which is adapted to pass a fuel-air mixture for combustion in said chamber and the opposite end of which is capped by means forming an afterburner section for said chamber which projects generally axially of and outwardly from said shell and forms therewith an outlet from said chamber, a tubular heat shield having a generally uniform cross section mounted about and in a generally concentric closely space relation to said shell to have one end positioned between the ends of said shell, relatively adjacent but spaced forwardly of said one end thereof, and its opposite end positioned beyond but relatively adjacent the projected extremity of the means defining said afterburner section of said chamber, means for directing air under pressure to said combustion chamber and to move air the length of the passage which is defined between said shell and said shield and beyond said shell along the axially projected length of the inner surface of said shield, and a second tubular shell of generally uniform cross section peripherally encompassing said shield and the first said shell in a concentric relatively closely spaced relation to said shield and extending the length of said shield and axially projecting beyond the respective ends thereof, said opposite end of said shield being at a location within, spaced from and relatively adjacent one axially projected extremity of said second tubular shell, said means for directing air under pressure being arranged to also direct air under pressure between said shield and said second shell and in contact with the inner surface of said second shell beyond said opposite end of said shield whereby to produce axially directed concentric layers of air flowing about the first said shell the outer layer of which is moderated as to its temperature with respect to the layer immediately inward thereof, said layers both being arranged to move in a high velocity flow with the outer layer being in an encompasing relation to the inner layer and projecting slightly beyond the inner layer beyond the outlet from said combustion chamber.

8. A portable space heater as in claim 7 wherein each of said shells and said heat shield is generally uniform in cross section.

9. A portable space heater comprising means defining a combustion chamber, means for delivery of fuel to said combustion chamber and ignition thereof, means for delivery of air to said combustion chamber to support combustion and entrain products of combustion from an entrance to said combustion chamber to an outlet therefrom, means for directing air under pressure about said combustion chamber and beyond its outlet, a construction provided at and beyond said outlet operative to produce a vortex flow of at least a portion of said air directed about said combustion chamber and beyond its outlet immediately adjacent said outlet, said vortex flow being positioned and arranged to moderate the temperature of the means defining the combustion chamber adjacent said outlet and avoid thereby a concentration therein of extreme heat, said means for delivery of fuel including a fuel pump having a drive shaft and said means for directing air under pressure about said combustion chamber including a motor having a drive shaft one end of which mounts an air moving means and the opposite end of which has a male-female slip fit coupling with the drive shaft of said fuel pump to provide for the simultaneous drive of said shafts, said coupling between said motor drive shaft and said pump drive shaft comprising a socket-type recess in the motor drive shaft and a tang-like projection on said fuel pump drive shaft.

10. A portable space heater comprising means defining a combustion chamber, means for the delivery of fuel of said combustion chamber and ignition thereof, means for delivery of air to said combustion chamber to support combustion and entrain the products of combustion from an entrance to said combustion chamber to an outlet therefrom, means for directing air under pressure about said combustion chamber and beyond its outlet, a construction provided at and beyond said outlet operative to produce a vortex flow of at least a portion of said air directed about said combustion chamber and beyond its outlet immediately adjacent said outlet, said vortex flow being positioned and arranged to moderate the temperature of the means defining the combustion chamber adjacent said outlet and to avoid thereby a concentration therein of extreme heat, said fuel delivery means including a fuel pump and a fuel tank, a suction line having its inlet projected within the interior of said tank and its discharge end in connection with the pumping chamber of said fuel pump and means included to produce a turbulence of the fuel in the tank immediately about the inlet end of the suction line to inhibit dirt and solids in the fuel passing to and through said suction line in the delivery of fuel to said combustion chamber.

11. A portable space heater comprising means defining a combustion chamber, means for the delivery of fuel to said combustion chamber and ignition thereof, means for delivery of air to said combustion chamber to support combustion said entrain the products of combustion from an entrance of said combustion chamber to an outlet therefrom, means for directing air under pressure about said combustion chamber and beyond its outlet, a construction provided at and beyond said outlet operative to produce a vortex flow of at least a portion of said air directed about said combustion chamber and beyond its outlet immediately adjacent said outlet, said vortex flow being positioned and arranged to moderate the temperature of the means defining the combustion chamber adjacent said outlet and to avoid thereby a concentration therein of extreme heat, said fuel delivery means including a fuel pump and a fuel tank, a suction line having its inlet end projected within the interior of said tank and its discharge end in connection with the pumping chamber of said fuel pump, said tank having a fuel outlet, a fuel filter unit inserted in said fuel outlet, said filter unit accommodating therein the inlet end of said suction line and being interposed between the inlet end of said suction line and the fuel in said tank and means are provided to produce a turbulence of the fuel within said filter unit and within the vicinity of the inlet to said suction line, said turbulence causing fuel within the filter unit to scrub the interior thereof and to inhibit the passage therethrough of objectionable dirt and solids, providing thereby that the fuel entering said suction line and passing by way of said fuel pump to said combustion chamber will be essentially clean.

12. A portable space heater as in claim 11 wherein said filter unit is adapted to have one end portion plug the fuel outlet of said fuel tank and includes in connection with said one end portion thereof a tubular screen device arranged to substantially bridge the tank and to receive therein the inlet end of said suction line in connection with the pumping chamber of said pump and said turbulence is produced within the boundary of said filter.

13. A portable space heater as in claim 12 wherein the pumping chamber of said pump has in connection therewith a fuel return line the discharge end of which is accommodated interiorly of said filter unit along with the inlet end of said suction line and said pump is operable to pass excess fuel delivered to the pumping chamber thereof, under pressure, to and through said return line to produce said turbulence within said filter device, in the vicinity of the inlet end of said suction line.

14. A method of controlling the temperature of a nose cone at the outlet from a space heater comprising a combustion chamber the peripheral wall of which is defined by a tubular shell having a front end and a rear end, having regard for its orientation in use, the rear end of which is adapted to pass a fuel-air mixture for combustion in said chamber and the front end of which is capped by a nose cone forming an afterburner section for said chamber which projects generally axially of and outwardly from said shell and forms therewith an outlet from said chamber, a tubular heat shield having a generally uniform cross section mounted about and in a generally concentric closely spaced relation to said shell to have one end, constituting its rear end, positioned between the ends of said shell, relatively adjacent but spaced forwardly of said rear end thereof, and its opposite end, constituting its front end, positioned beyond but relatively adjacent the projected extremity of said nose cone, and means for directing air under pressure to said combustion chamber and to move air the length of the passage which is defined between said shell and said shield and beyond said front end of said shell along an axial length of the inner surface of said shield projected beyond said nose cone, said method comprising the steps of producing a contained high velocity flow of air, under pressure, about said combustion chamber and beyond said nose cone a distance in a range not exceeding about one half the diameter of the base of said cone to thus create a pressure in the periphery of the flow greater than that immediately about the exterior surface of the nose cone and produce thereby a vortex flow pattern of a portion of said air immediately of said nose cone and in a heat exchanging relation to the products of combustion created in and directed from said combustion chamber whereby to moderate and significantly reduce the operating temperature of the cone and eliminate a potentially dangerous hot spot in connection with the heater.

* * * * *

UNITED STATES PATENT AND TRADEMARK OFFICE
CERTIFICATE OF CORRECTION

PATENT NO. : 4,201,544
DATED : May 6, 1980
INVENTOR(S) : Eugene C. Briggs; and William E. Gustafson It is certified that error appears in the above-identified patent and that said Letters Patent are hereby corrected as shown below:

In the ABSTRACT, line 7, "pressurized" is corrected to read -- pressured --;

line 8, -- a -- is inserted following "shield,".

Col. 3, line 37, "closed" is corrected to read -- closely --;

line 46, "in" is corrected to read -- is --.

Col. 8, line 21, "one" is corrected to read -- cone --;

line 34, "sports" is corrected to read -- spots --;

line 37, "heat" is corrected to read -- heater --.

Col. 10, line 24 (Claim 7, line 11), "space" is corrected to read -- spaced.

Col. 11, line 19 (Claim 10, line 3) "of" is corrected to read -- to --;

UNITED STATES PATENT AND TRADEMARK OFFICE
CERTIFICATE OF CORRECTION

PATENT NO. : 4,201,544

DATED : May 6, 1980

INVENTOR(S) : Eugene C. Briggs; and William E. Gustafson

It is certified that error appears in the above-identified patent and that said Letters Patent are hereby corrected as shown below:

Col. 11, line 45 (Claim 11, line 5), "said" is corrected to read -- and --;

Col. 11, line 46 (Claim 11, line 7), "of" is corrected to read -- to --.

Signed and Sealed this

Twenty-sixth Day of August 1980

[SEAL]

Attest:

SIDNEY A. DIAMOND

Attesting Officer

Commissioner of Patents and Trademarks